(12) United States Patent
Tang et al.

(10) Patent No.: US 10,311,295 B2
(45) Date of Patent: Jun. 4, 2019

(54) HEURISTIC FINGER DETECTION METHOD BASED ON DEPTH IMAGE

(71) Applicant: BOE TECHNOLOGY GROUP CO., LTD., Beijing (CN)

(72) Inventors: Xiaojun Tang, Beijing (CN); Jibo Zhao, Hong Kong (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/553,710

(22) PCT Filed: Mar. 17, 2017

(86) PCT No.: PCT/CN2017/077065
§ 371 (c)(1),
(2) Date: Aug. 25, 2017

(87) PCT Pub. No.: WO2018/049801
PCT Pub. Date: Mar. 22, 2018

(65) Prior Publication Data
US 2018/0239957 A1    Aug. 23, 2018

(30) Foreign Application Priority Data
Sep. 14, 2016 (CN) .......................... 2016 1 0823569

(51) Int. Cl.
*G06K 9/00* (2006.01)
*G06T 1/60* (2006.01)
(Continued)

(52) U.S. Cl.
CPC ..... *G06K 9/00382* (2013.01); *G06K 9/00201* (2013.01); *G06K 9/00375* (2013.01);
(Continued)

(58) Field of Classification Search
CPC ................ G06F 3/017; G06K 9/00375; G06K 9/00382; G06K 9/00389; G06K 9/00355
See application file for complete search history.

(56) References Cited

U.S. PATENT DOCUMENTS

| 8,902,161 B2 | 12/2014 | Murase et al. |
| 9,189,068 B2 | 11/2015 | Im |

(Continued)

FOREIGN PATENT DOCUMENTS

| CN | 102778953 A | 11/2012 |
| CN | 103353935 A | 10/2013 |

(Continued)

OTHER PUBLICATIONS

Search Report for International Application No. PCT/CN2017/077065 dated May 5, 2017.

*Primary Examiner* — Wesley J Tucker
(74) *Attorney, Agent, or Firm* — Calfee, Halter & Griswold LLP (57) ABSTRACT

A heuristic finger detection method based on a depth image is disclosed. The method includes the steps of: acquiring a hand connected region from a user's depth image; calculating the central point of the hand connected region; calculating a plurality of extremely far points in the hand connected region that have extremum 3D geodesic distances from the central point; detecting fingertips and finger regions from the plurality of calculated extremely far points; and outputting fingertip positions and the finger regions. The method calculates and detects fingertips of users by means of 3D geodesic distance, without extracting boundary contours of hand regions, which improves robustness of gesture detection and reduces detection error rates. The method has the advantages of higher finger detection accuracy and fast computing speed.

17 Claims, 7 Drawing Sheets

(51) Int. Cl.
 *G06T 7/11* (2017.01)
 *G06T 7/529* (2017.01)
 *G06T 7/543* (2017.01)

(52) U.S. Cl.
 CPC .............. *G06T 1/60* (2013.01); *G06T 7/11* (2017.01); *G06T 7/529* (2017.01); *G06T 7/543* (2017.01); *G06T 2207/10028* (2013.01); *G06T 2207/30196* (2013.01)

(56) References Cited

U.S. PATENT DOCUMENTS

| | | | |
|---|---|---|---|
| 2011/0129124 A1* | 6/2011 | Givon | G06F 3/011 382/107 |
| 2013/0249786 A1* | 9/2013 | Wang | G06F 3/011 345/156 |
| 2014/0118335 A1 | 5/2014 | Gurman | |
| 2014/0247964 A1* | 9/2014 | Kurokawa | G06F 3/005 382/103 |
| 2015/0269425 A1* | 9/2015 | Mazurenko | G06K 9/00355 382/103 |
| 2016/0112150 A1* | 4/2016 | Godefroy | G01S 5/0252 370/252 |
| 2017/0091944 A1* | 3/2017 | Taguchi | H04N 5/247 |
| 2017/0293364 A1* | 10/2017 | Wang | G06F 3/011 |

FOREIGN PATENT DOCUMENTS

| | | |
|---|---|---|
| CN | 103488972 A | 1/2014 |
| CN | 105046249 A | 11/2015 |

\* cited by examiner

HEURISTIC FINGER DETECTION METHOD BASED ON DEPTH IMAGE

RELATED APPLICATION

The present application is the U.S. national phase entry of PCT/CN2017/077065 with an International filing date of Mar. 17, 2017, which claims the benefit of Chinese Patent Application No. 201610823569.7, filed on Sep. 14, 2016, the entire disclosure of which is incorporated herein by reference.

TECHNICAL FIELD

The present disclosure relates to the technologies of intelligent human-computer interaction and gesture recognition, and more particularly to a heuristic finger detection method based on a depth image, a detection device and a computer readable storage medium.

BACKGROUND ART

With the rapid development of human-computer interaction technology, there are more and more human-computer interaction means. Human-computer interaction between human and computer devices is realized by keyboards and mice at the very beginning, then by writing pads and touch screens and now by gestures. Human-computer interaction is becoming more and more intuitive and convenient, and increasingly conforms to people's natural habits.

In many intelligent device systems, such as AR (augmented reality) glasses, VR (virtual reality) head-mounted displays and smart TVs, there is a need for automatic detection of finger movements so as to realize interaction with devices by means of finger movements. In the course of interaction, a common RGB camera is usually used to acquire images and detect finger movements in order to implement the gestures based interaction with devices.

SUMMARY

The method employing the RGB camera as mentioned above is susceptible to interference by a background image, thereby leading to poor accuracy. As depth cameras become gradually popular in recent years, more and more institutions and companies start to try to use a depth image to detect finger movements. A method based on a depth image has higher detection accuracy than a method based on RGB camera.

A finger detection method based on a depth image detects fingertips by maximum contour curvature. This method first extracts boundary contour of a hand region, then calculate the curvature of contour points one by one, and select a maximum curvature finger point as a fingertip candidate point. Nevertheless, under the condition where a background image is very complicated, this method still has a great detection error rate.

To solve or alleviate at least one defect in the art, it is desired to provide a new finger detection technology capable of achieving higher detection accuracy and a faster detection speed.

According to one aspect, there is provided a finger detection method comprising the steps of: acquiring a hand connected region from a user's depth image; calculating the central point of the hand connected region; calculating a plurality of extremely far points (i.e. extremum points) in the hand connected region that have extremum 3D geodesic distances from the central point; detecting fingertips and finger regions from the plurality of calculated extremely far points; and outputting fingertip positions and the finger regions.

In an embodiment, the step of acquiring a hand connected region from a user's depth image further comprises the steps of: detecting all connected regions in the user's depth image by an image growing method; and selecting a connected region with the smallest depth among the detected connected regions as a hand connected region.

In an embodiment, the step of acquiring a hand connected region from a user's depth image further comprises the step of determining the smallest depth of each connected region of the detected connected regions as the depth of the connected region.

In an embodiment, the image growing method further comprises the step of, for each connected region, implementing the following steps:

establishing a FIFO queue, and selecting one pixel point in the connected region as an initial pixel point to put it in the FIFO queue;

iteratively implementing the following steps for the FIFO queue until no pixel point in the FIFO queue needs to be processed:

extracting a current pixel point in the FIFO queue;

comparing the depth of the current pixel point with the depth of each of four adjacent pixel points that are not in any connected region; and if the depth difference between the adjacent pixel point and the current pixel point is less than a first threshold Tth1, adding the adjacent pixel point into the connected region and the FIFO queue; and outputting the connected region.

In an embodiment, the image growing method further comprises the step of, for each connected region, detecting the upper, lower, left and right boundaries of the connected region.

In an embodiment, the reference value of the first threshold Th1 ranges from 10 mm to 15 mm.

In an embodiment, the step of calculating the central point of the hand connected region further comprises the steps of: calculating the average value of the X coordinates of all the pixel points in the hand connected region as the X coordinate of the central point; and calculating the average value of the Y coordinates of all the pixel points in the hand connected region as the Y coordinate of the central point.

In an embodiment, the step of calculating the central point of the hand connected region further comprises the steps of: if the calculated central point is not in the hand connected region, appropriately adjusting the position of the central point so as to make the central point in the hand connected region.

In an embodiment, if the calculated central point is a null point in the depth image, the calculated central point is not in the hand connected region, wherein the null point is a point with the depth of 0 in the user's depth image.

In an embodiment, the step of calculating a plurality of extremely far points in the hand connected region that have extremum 3D geodesic distances from the central point further comprises:

S301: constructing a distance matrix of the same size as the hand connected region, the distance matrix having elements corresponding to the pixels of the hand connected region in a one-to-one relationship;

S302: as for the elements corresponding to the pixels, the depth of which is not 0, setting the distance of the elements to be a maximum value, and as for the elements corresponding to the pixels, the depth of which is 0, setting the distance of the elements to be a negative number to mean that the distance of these points need not to be calculated;

S303: taking the central point as an initial extremely far point;

S304: setting the distance of the initial extremely far point in the distance matrix to be 0, and updating the distance matrix according to the minimum value of the 3D geodesic distances between each pixel point with the initial extremely far point as well as all the calculated extremely far points in the hand connected region; and S305: determining the point having the largest distance in the updated distance matrix as the calculated extremely far point, and using the calculated extremely far point as a new initial extremely far point.

Repeat the steps S304 and S305 to calculate five to nine extremely far points.

In an embodiment, the step of updating the distance matrix in the step S304 further comprises the steps of:

establishing a FIFO queue, adding the initial extremely far point to the FIFO queue, and iteratively implementing the following steps for the FIFO queue until no pixel point in the FIFO queue needs to be processed:

extracting the current pixel point from the FIFO queue; for each of the eight neighbourhood points of the current pixel point, calculating the three-dimensional distance d between the neighbourhood point and the current pixel point; if the distance of the neighbourhood point is greater than the sum of the distance of the current pixel point and the three-dimensional distance d, setting the distance of the neighbourhood point to be the sum of the distance of the current pixel point and the three-dimensional distance d and adding the neighbourhood point into the FIFO queue.

In an embodiment, the maximum value is 100,000 mm.

In an embodiment, the step of detecting fingertips and finger regions from the plurality of calculated extremely far points further comprises the steps of:

determining the plurality of extremely far points as a plurality of fingertip candidate points P; and for each fingertip candidate point P, implementing the following iteration process:

detecting, step by step, the 3D geodesic distances between the surrounding points of the fingertip candidate point P and the fingertip candidate point P from inside to outside starting from the fingertip candidate point P; and adding the surrounding points into the finger point set if the 3D geodesic distances are less than the predetermined distance threshold;

if the width of the finger point set is less than a second threshold Th2, adding the predetermined distance threshold with a step size, or otherwise judging whether there are still unprocessed fingertip candidate points P; and if there are still unprocessed fingertip candidate points P, then selecting a next unprocessed fingertip candidate point P and repeating the iteration process; and if there are not unprocessed fingertip candidate points P, exiting the iteration process.

In an embodiment, the step of detecting, step by step, the 3D geodesic distances between the surrounding points of the fingertip candidate point P and the fingertip candidate point P from inside to outside starting from the fingertip candidate point P further comprises the steps of:

conducting a distance matrix of the same size as the hand connected region, the distance matrix having elements corresponding to the pixels of the hand connected region in a one-to-one relationship;

as for the elements corresponding to the pixels, the depth of which is not 0, setting the distance of the elements to be a maximum value, and as for the elements corresponding to the pixels, the depth of which is 0, setting the distance of the elements to be a negative number to mean that the distance of these points need not to be calculated;

setting the distance corresponding to the fingertip candidate point P to be 0;

establishing a FIFO queue, adding the fingertip candidate point P to the FIFO queue, and iteratively implementing the following steps for the FIFO queue until no pixel point in the FIFO queue needs to be processed:

extracting the current pixel point from the FIFO queue; for each of the eight neighbourhood points of the current pixel point, calculating the three-dimensional distance d between the neighbourhood point and the current pixel point; if the distance of the neighbourhood point is greater than the sum of the distance of the current pixel point and the three-dimensional distance d, setting the distance of the neighbourhood point to be the sum of the distance of the current pixel point and the three-dimensional distance d and adding the neighbourhood point into the FIFO queue; and detecting, step by step, the distance of the surrounding points of the fingertip candidate point P in the updated distance matrix from inside to outside starting from the fingertip candidate point P.

In an embodiment, the reference value of the second threshold Th2 is 35 mm.

In an embodiment, the reference value of the step size is 3 mm.

In an embodiment, the step of detecting fingertips from the plurality of calculated extremely far points further comprises the steps of: comparing the length of the finger point set with a third threshold Th3; if the length of the finger point set is greater than or equal to the third threshold Th3, determining the fingertip candidate point P as a real fingertip; and if the length of the finger point set is less than the third threshold Th3, determining the fingertip candidate point P as an unreal fingertip.

In an embodiment, the reference value of the third threshold Th3 is 40 mm.

According to another aspect, there is provided a finger detection device. The finger detection device comprises a hand connected region acquisition unit configured to receive a user's depth image and acquire a hand connected region from the depth image; a central point determination unit configured to calculate the central point of the hand connected region; an extremely far point calculation unit configured to calculate a plurality of extremely far points in the hand connected region that have extremum 3D geodesic distances from the central point; a finger detection unit configured to detect fingertips and finger regions from the plurality of calculated extremely far points; and an output unit configured to output fingertip positions and the finger regions.

According to another aspect, there is provided a computer readable storage medium, which stores computer readable instructions which, when executed by a computing device, cause the computing device to implement any method as stated above.

According to another aspect, there is provided a finger detection device. The finger detection device comprises a memory configured to store computer readable instructions and data; and a processor coupled to the memory, which is configured to execute the computer readable instructions to implement any method as stated above.

The embodiments of the present disclosure can achieve at least one of the following advantageous effects and/or other advantageous effects:

in comparison with the conventional method which detects fingertips by maximum contour curvature, the heuristic detection method provided by the present disclosure has better fingertip detection accuracy and stronger robustness against noises.

To be specific, the embodiments of the present disclosure use a depth image to detect fingers and effectively remove interference of a background image by extracting a hand connected region; use 3D geodesic distance to detect extremely far points in the connected region, have good robustness against image noises and gesture changes; take the extremely far points in the connected region as fingertip candidate points to detect a finger point set, and judge whether candidate points are real fingertips according to the largest width and smallest length of fingers, which can determine real fingertips and finger regions more quickly and accurately. The above methods achieve an effect of accurate and quick finger detection, and greatly enhance the robustness of finger detection against noises. The technology of the present disclosure achieves higher detection accuracy with a detection speed of up to 300 frames per second.

BRIEF DESCRIPTION OF DRAWINGS

To explain the technical solutions of the embodiments more clearly, the drawings necessary for describing the embodiments will be briefly introduced. It should be realized that the following drawings are only related to some embodiments. Those skilled in the art can obtain other drawings according to these drawings without making inventive effort, and the other drawings also fall within the scope of the present invention.

DETAILED DESCRIPTION

For clearer understanding of the object, technical solutions and advantages of some embodiments, these embodiments will be further described in detail with reference to drawings and examples.

Figure 1:
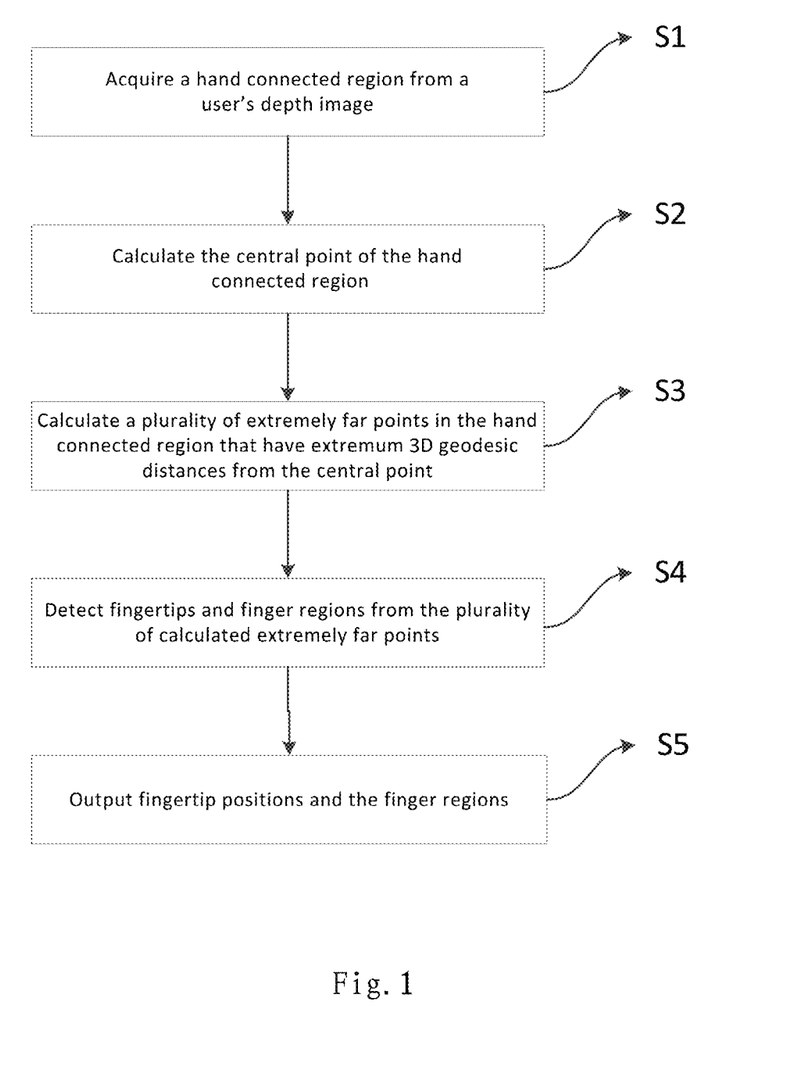
FIG. 1 is a flow chart of a finger detection method according to an embodiment of the present invention.

FIG. 1 is a flow chart of a finger detection method according to an embodiment of the present invention. The finger detection method is a heuristic finger detection method based on a depth image, which detects fingers by analyzing the depth image taken by a depth camera in a heuristic manner. The method detects fingertip positions and a finger point set by the five steps of acquiring a hand connected region, calculating the central point of the hand connected region, calculating extremely far points of the hand connected region, detecting fingertips and outputting fingertip positions and finger regions. The term "connected region" used herein refers to a set composed of non-null pixel points that are mutually connected in the depth image, wherein the depth difference between adjacent pixel points is very small. Mutually connected means any two pixel points in the pixel point set can be directly connected or connected via other pixel point in the set.

As shown in FIG. 1, the finger detection method comprises the following five steps. First, in the step S1, a hand connected region is acquired from a user's depth image. Then in the step S2, the central point of the hand connected region is calculated. Later in the step S3, a plurality of extremely far points in the hand connected region are calculated which have extremum 3D geodesic distances from the central point. Next in the step S4, fingertips and finger regions are detected from the plurality of calculated extremely far points. Finally in the step S5, fingertip positions and the finger regions are output. The method has the advantages of high finger detection accuracy and fast computing speed.

Exemplary implementations for the various steps of the finger detection method will be specifically explained with reference to FIGS. 2 to 10.

Figure 2:
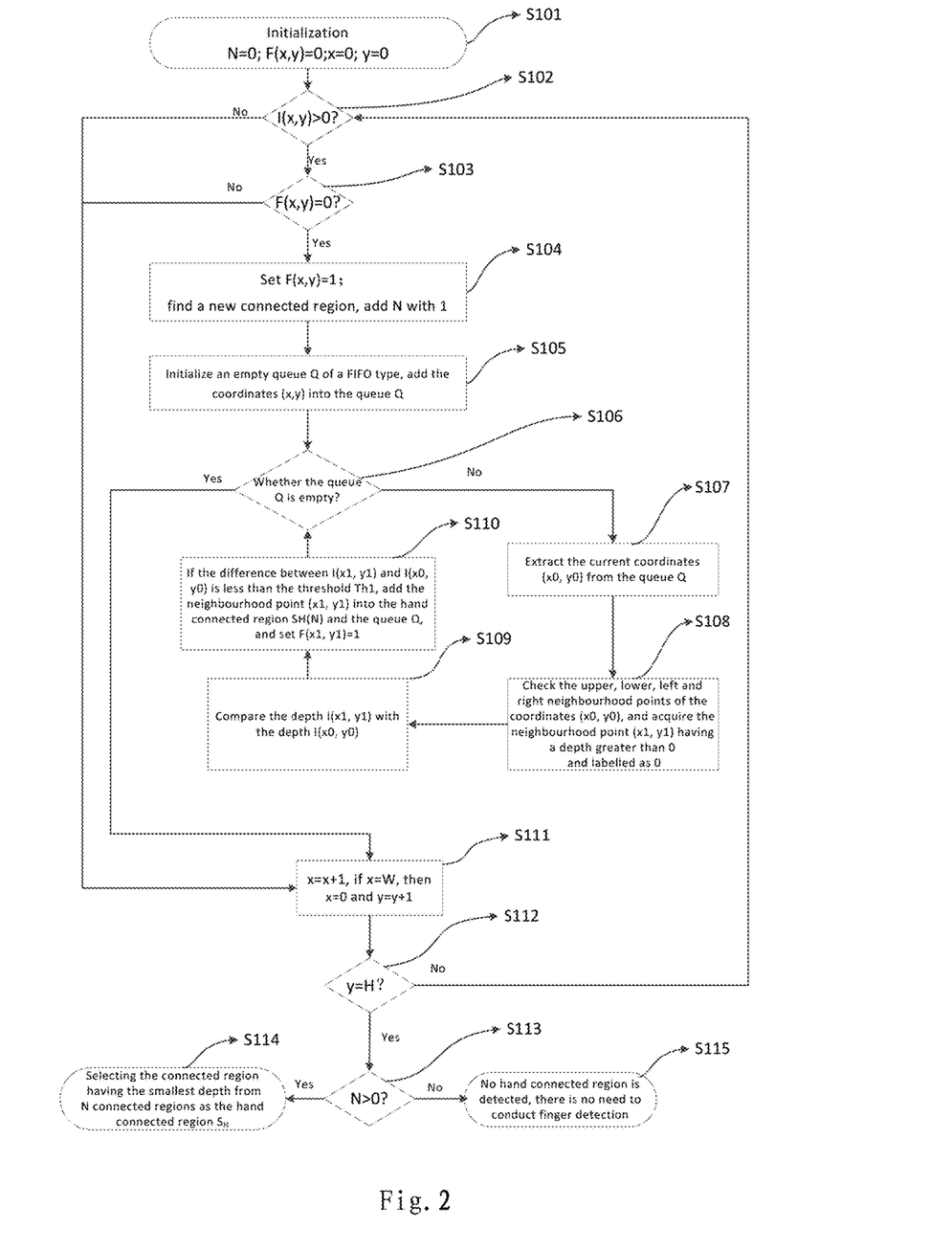
FIG. 2 is a flow chart of a method for acquiring a hand connected region according to an embodiment of the present invention.
Figure 3:
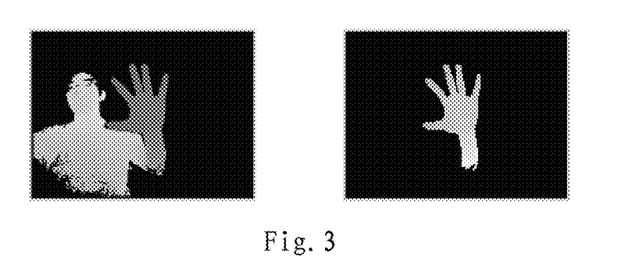
FIG. 3 is a schematic view of a depth image and the hand connected region according to an embodiment of the present invention.

FIG. 2 is a flow chart of a method for acquiring a hand connected region according to an embodiment of the present invention. Before acquiring the hand connected region, a depth camera needs to first shoot a user's depth image, which is a two-dimensional image I. Different from a common RGB camera which acquires red, green and blue component intensity of each point of an image, the depth camera acquires the distance depth $I(x, y)$ of each point in an image to the camera. In FIG. 3, the left view shows an exemplary view of an original depth image shot by the depth camera.

The depth image usually contains a plurality of connected regions. In a scene of gesture operation, since a hand at the time of gesture operation usually appears foremost and is closest to the camera, the connected region where the hand appears is the one having the smallest depth. Thus, all the connected regions can be detected by an image growing method, the connected region having the smallest depth can be selected as the hand connected region, and the point set of hand connected regions can be called $S_H$.

An exemplary method for acquiring a hand connected region will be introduced with reference to FIG. 2. As shown in FIG. 2, all connected regions and hand connected regions $S_H$ in the depth image can be detected in the following process. At first, an image width W and height H is determined for an inputted two-dimensional depth image I. Then, initialization is performed in the step S101, including the step setting the total number N of determined connected regions as an initial value 0, and initializing the value of each element in a label matrix F(x,y) as 0, which indicates that none of any pixel points in the current image join in any connected region. Meanwhile, an anchor is designated to indicate the connected region searching progress, the coordinates x and y of the anchor is set to be an initial value 0, namely a pixel point at the upper left corner of the image. That is to say, the method will start searching connected regions from the upper left corner of the image. At this time, searching can be conducted in the depth image in an order from left to right and from top to bottom. However, in other embodiments, it is also possible to start searching the connected regions from other position. For example, it is possible to start searching the connected regions from such positions as an upper right corner, a lower left corner or a lower right corner in a different searching order. The present invention is not limited to any particular searching position and searching order.

After performing the initialization, proceed to the step S102 to judge whether the depth I(x, y) of the current anchor is greater than 0, namely, judge whether the point is a null point. If the depth I(x, y) is greater than 0, go to the step S103; or otherwise, jump to the step S111. In the step S103, it is judged whether the label F(x, y) of the anchor is equal to 0. If the label F(x, y) is equal to 0, go to the step S104; or otherwise, jump to the step S111.

If the depth I(x, y) of the current anchor (x, y) is greater than 0, and the label F(x, y) of the anchor is equal to 0, it means a new connected region S is found. Then, in the step S104, the total number N of the connected regions is increased by 1. The newly added connected region is set as S(N), the current anchor (x, y) is added into the connected region S(N), and meanwhile the label F(x, y) of the anchor is set as 1, which indicates that the pixel point (x, y) has been added into the connected region S(N). In this embodiment, said current anchor (x, y) acts as the initial point of detecting the new connected region S(N). It shall be pointed out that although the method in this embodiment uses the leftmost pixel point in the first row of pixel points in the connected region as the initial point for detecting the connected region S(N), those skilled in the art can understand that the following process for detecting the connected region S(N) can be applicable to the situation where any pixel point in the connected region can serve as an initial point.

After completion of the step S104, go on to the step S105 so as to determine the complete point set of the newly found connected region S(N). In the step S105, an empty queue Q of a First in, First out (FIFO) type is first initialized, then the initial point (i.e., the Coordinates (x, y)) is added into the Q. The, go on to the step S106. In the step S106, it is judged whether the queue Q is empty. If it is empty, it means the complete point set of the connected region S(N) has been determined, and jump to the step S111; or otherwise, go on to the step S107. In the step S107, the current coordinates $(x_0, y_0)$ is extracted from Q. Then go on to the step S108 to check the upper, lower, left and right neighbourhood of the coordinates $(x_0, y_0)$ to obtain all the neighbourhood points $(x_1, y_1)$ having a depth greater than 0 and a label equal to 0 in the four neighbourhood. Then, in the step S109, the depth $I(x_1, y_1)$ of all the obtained neighbourhood points $(x_1, y_1)$ is compared with the depth $I(x_0, y_0)$ of the pixel point $(x_0, y_0)$. Then, go on to the step S110. If the difference between the depth $I(x_1, y_1)$ and the depth $I(x_0, y_0)$ is less than the threshold $Th_1$, then the neighbourhood point $(x_1, y_1)$ is added into the queue Q and the connected region S(N). Meanwhile, the label $F(x_1, y_1)$ of the point is set as 1. In an embodiment, the reference value of the threshold $Th_1$ ranges from 10 mm to 50 mm. Moreover, those skilled in the art can understand, in the steps S108 to S110, four neighbourhood points can be processed at one time, that is, the steps S108 to S110 are conducted sequentially for all of the four neighbourhood points, or one neighbourhood point is processed at one time, that is, the steps S108 to S110 are conducted for each neighbourhood point sequentially. After the detection of the four neighbourhood points is completed, return to the step S106 to continue to judge whether the queue Q is empty. The steps S106 to S110 are performed iteratively by means of such an image growing method until the queue Q is empty. That the queue Q is empty indicates that the complete point set of the connected region S(N) has been determined, and then jump to the step S111 to continue searching the next connected region. Optionally, after the connected region S(N) is determined, the upper, lower, left and right boundaries of the connected region S(N) can be detected incidentally. For example, after all the pixel point set of the connected region S(N) is detected, the coordinates of the upmost, lowermost, leftmost and rightmost pixel points of the connected region are detected and used as the upper, lower, left and right boundaries of the connected region S(N) respectively. In an embodiment, the method can also comprise the step of determining the smallest depth or average depth of the connected region S(N) as the depth of the connected region S(N).

In the step S111, the x coordinate of the anchor is increased by 1, namely, x=x+1. If x is equal to the image width W, it means it is necessary to change the line, and x shall be reset to be 0, and y be increased by 1. The step S111 actually moves the anchor in an order from left to right and from top to bottom. Then, in the step S112, it is judged whether y is equal to the image height H. If y is not equal to the image height H, return to the step S102 to continue to search and determine the next connected region. Otherwise, if y is equal to the image height H, it means all the pixel points have been processed and go on to the step S113. In the step S113, it is judged whether the total number N of the connected regions is greater than 0. If N is greater than 0, it means N connected regions have been detected and go on to the step S114. In the step S114, a connected region having the smallest depth among the N connected regions is selected as the hand connected region $S_H$. When the smallest depth of the connected region S(N) serves as the depth of the connected region S(N), the hand connected region $S_H$ can be determined more accurately because a hand is usually closest to a camera, and non-null points having the smallest depth in the depth image most probably appear in the hand connected region. If N is not more than 0 in the step S113, it means no connected regions are detected, the shot depth image is a blank image, no finger detection is necessary and the method exits in the step S115.

The right view in FIG. 3 shows an exemplary view of the hand connected region $S_H$ as acquired. As shown, a detected hand connected region $S_H$ usually includes not only fingers and a palm, but also an arm portion. The subsequent steps will detect fingers on the basis of the hand connected region $S_H$. In some embodiments, for easy representation of a connected region S(N), the connected region S(N) may be represented as a matrix which needs to cover all pixel points of the hand connected region. In the matrix, the depth of the element corresponding to the pixel point of the hand connected region is the depth of the corresponding pixel point, and the depth of other elements may be set to be 0. For example, the matrix may, as shown in the right view in FIG. 3, cover a scope larger than the hand connected region, wherein the depth of each point in, e.g., a hand region (namely, a light-coloured region) is the depth of the corresponding pixel point, and the depth of each point in the region outside of the hand (namely, a black or dark-coloured region) is 0. Of course, the matrix may also be determined by the upper, lower, left and right boundaries of the hand connected region. The matrix determined in this way is smaller, hence the computing load necessary for processing the hand connected region is less, and the processing speed is faster.

Figure 4:
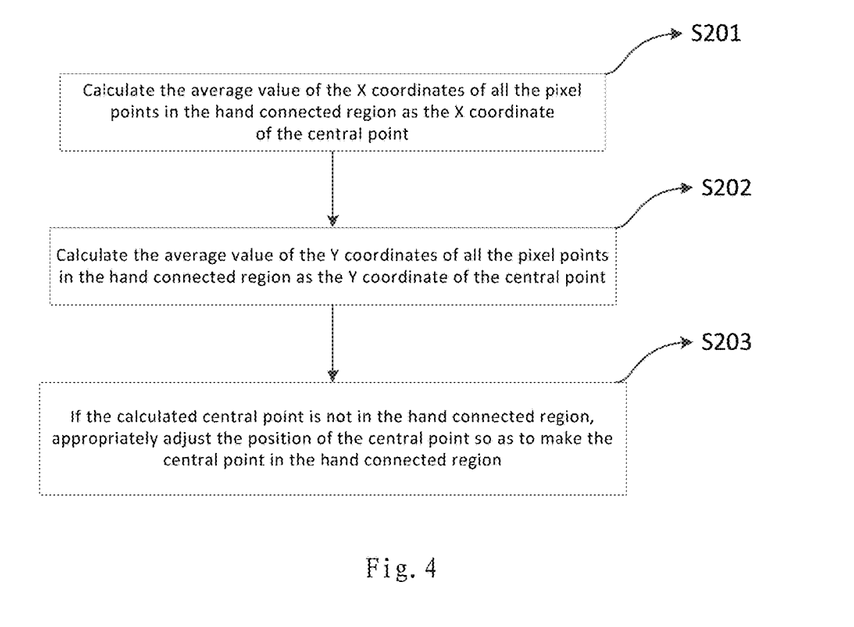
FIG. 4 is a flow chart of a method for calculating the central point of the hand connected region according to an embodiment of the present invention.

FIG. 4 is a flow chart of a method for calculating the central point of the hand connected region according to an embodiment of the present invention. As shown in FIG. 4, the method of calculating the central point of the hand connected region comprises the steps that:

in the step S201, the average value of the X coordinates of all the pixel points in the hand connected region $S_H$ is calculated as the X coordinate $x_c$ of the central point. It shall be pointed out that the hand connected region $S_H$ herein refers to the originally determined hand connected region, rather than the matrix representing the hand connected region as mentioned above.

In the step S202, the average value of the Y coordinates of all the pixel points in the hand connected region is calculated as the Y coordinate $y_c$ of the central point. Similarly, the hand connected region $S_H$ herein refers to the originally determined hand connected region, rather than the matrix representing the hand connected region as mentioned above.

The above process may be represented as:

$$\begin{cases} x_c = \dfrac{1}{N_H} \sum_{(x,y) \in H} x \\ y_c = \dfrac{1}{N_H} \sum_{(x,y) \in H} y \end{cases}.$$

Considering that noises may exist in the depth image, the calculated central point ($x_c$, $y_c$) may be located at a null point (which may be, for example, a point having a depth of 0 in the user's depth image) in the depth image. If this is the case, $x_c$ and $y_c$ need to be appropriately adjusted in upper, lower, left and right directions so as to make the central point be located in the hand connected region $S_H$. Thus, calculating the central point of the hand connected region may also comprise the step S203: if the calculated central point is not in the hand connected region, then the position of the central point will be appropriately adjusted so as to make the central point be located in the hand connected region. In an exemplary implementation, the adjusting step may comprise: first checking whether the pixel point 1 pixel above the calculated central point is in the hand connected region, if it is in the hand connected region, the central point is adjusted to the pixel point 1 pixel above and the operation ends; otherwise continuing to check the pixel point 1 pixel below, the pixel point 1 pixel to the left, the pixel point 1 pixel to the right until the point in the hand connected region is found. If none of the pixel point 1 pixel above, the pixel point 1 pixel below, the pixel point 1 pixel to the left and the pixel point 1 pixel to the right are in the hand connected region, continue to search the pixel points 2 pixels from the calculated central point. By analogy, the method doesn't stop until the point in the hand connected region is found.

Figure 5:
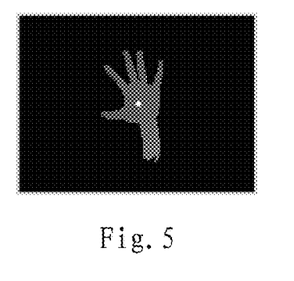
FIG. 5 is a schematic view of the central point of the hand connected region according to an embodiment of the present invention.

FIG. 5 schematically shows the central point of the hand connected region calculated according to an embodiment of the present invention. As shown in FIG. 5, the central point of the hand connected region is shown at the white point.

Figure 6:
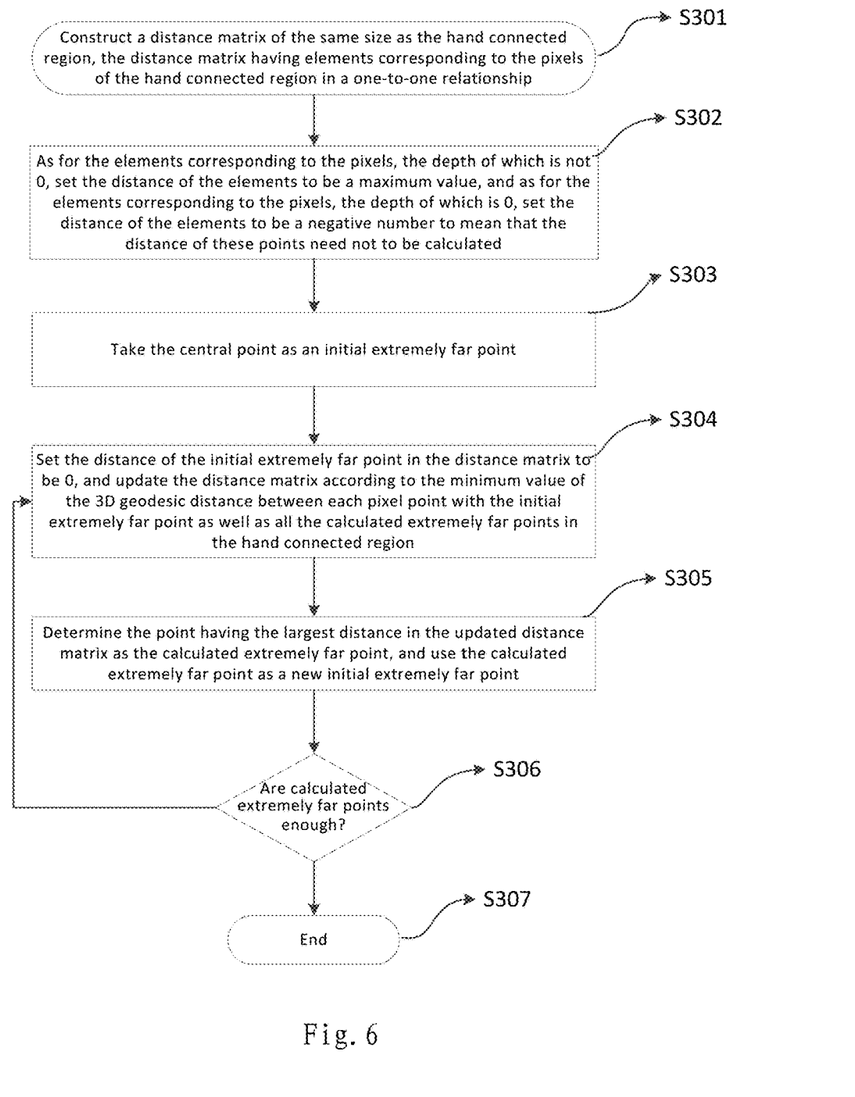
FIG. 6 is a flow chart of a method for calculating extremely far points of the hand connected region according to an embodiment of the present invention.

FIG. 6 is a flow chart of a method for calculating extremely far points (i.e. extremum points) of the hand connected region according to an embodiment of the present invention. In the embodiment, the extremely far points are calculated according to the 3D geodesic distance. The "3D geodesic distance" between two points in a space refers to the length of the shortest curve connecting the two points in the connected region, and the points on the curve must all appear in the connected region. In comparison with the common Euclidean distance indicative of the straight-line distance between two points (the points on the straight line may not be in the connected region), the solution using the 3D geodesic distance has higher robustness against gesture change and can detect more stable extremely far points. It can be clearly seen in the hand connected region shown in the drawing that the "Euclidean distance" between two adjacent fingertips is relatively small, but the "3D geodesic distance" therebetween is relatively large. If "Euclidean distance" is used to constitute the distance matrix, fingertips may not necessarily be the extremely far points. But if "3D geodesic distance" is used to constitute the distance matrix, fingertips are always the points having extremum distance values. Thus, higher robustness can be guaranteed if "3D geodesic distance" is used to constitute the distance matrix and detect the points having extremum distance values as the fingertip candidate points.

In some embodiments, the method for calculating the extremely far points of the hand connected region comprises three phases: initializing the distance matrix, updating the distance matrix and selecting the extremely far points according to the distance matrix.

As shown in FIG. 6, the step of calculating a plurality of extremely far points in the hand connected region that have extremum 3D geodesic distances from the central point comprises steps S301 to S307, wherein the steps S301 and S302 belong to the first phase: initializing the distance matrix; the steps S303 and S304 belong to the second phase: updating the distance matrix; and the step S305 belongs to the third phase: selecting the extremely far points according to the distance matrix.

At first, in the step S301, a distance matrix D of the same size as the hand connected region is constructed, the distance matrix having elements D(x,y) corresponding to the pixels of the hand connected region in a one-to-one relationship. Then the distance matrix is initialized in the step S302. As for the elements corresponding to the pixels, the depth of which is not 0, the distance of the elements is set to a maximum value, and as for the elements corresponding to the pixels, the depth of which is 0, the distance of the elements is set to a negative number to mean that the distance of these points need not to be calculated. The maximum value may be any extreme remote distance that is not reachable for a human palm. In an embodiment, the maximum value may be 100,000 mm. The negative number may be set to be −1.

Next, the distance matrix needs to be updated to obtain an extremely far point. Before that, an initial extremely far point shall be set so as to initiate the updating of the distance matrix. In the step S303, take the central point as an initial extremely far point. Then in the step S304, the corresponding distance of the initial extremely far point in the distance matrix is set to 0, and the distance matrix is updated according to the minimum value of the 3D geodesic distances between each pixel point with the initial extremely far point as well as all the calculated extremely far points in the hand connected region In an embodiment, the step of updating the distance matrix in the step S304 further comprises the steps of:

establishing a FIFO queue, adding the initial extremely far point to the FIFO queue, and iteratively carrying out the following steps for the FIFO queue until no pixel point in the FIFO queue needs to be processed:

extracting the current pixel point $(x_0, y_0)$ from the FIFO queue; for each neighbourhood point $(x_1, y_1)$ of the upper, lower, left, right, upper-left, upper-right, lower-left and lower-right neighbourhood points of the current pixel point, calculating the three-dimensional distance d between the neighbourhood point $(x_1, y_1)$ and the current pixel point $(x_0, y_0)$; if the distance of the neighbourhood point $(x_1, y_1)$ is greater than the sum of the distance of the current pixel point $(x_0, y_0)$ and the three-dimensional distance d, setting the distance of the neighbourhood point $(x_1, y_1)$ to be the sum of the distance of the current pixel point $(x_0, y_0)$ and the three-dimensional distance d and adding the neighbourhood point $(x_1, y_1)$ into the FIFO queue. In this process, neighbourhood points having a negative distance value need not be processed because they are not the pixel points in the hand connected region. In addition, as a faster computing manner, the distance of the neighbourhood point $(x_1, y_1)$ can be first compared with that of the current pixel point $(x_0, y_0)$. If the distance of the neighbourhood point $(x_1, y_1)$ is less than that of the current pixel point $(x_0, y_0)$, there is no need to calculate the three-dimensional distance d and update the neighbourhood point.

After the step of updating the matrix which includes the iteration process is completed, go on to the step S305. In the step S305, the point having the largest distance in the updated distance matrix is determined as the calculated extremely far point, and use the calculated extremely far point as a new initial extremely far point. It shall be pointed out that after each updating, the distance D(x,y) in the distance matrix is the minimum value of the 3D geodesic distance between the points with the central point as well as the calculated extremely far points in the hand connected region, and the point having the maximum distance value in the distance matrix is found out to serve as a new extremely far point.

In the step S306, it is judged whether the number of the calculated extremely far points meets the requirement, i.e., whether K extremely far points are obtained in addition to the central point. In an embodiment, K ranges from 5 to 9. If the number meets the requirement, the calculation in the step S307 ends, and the calculated extremely far points are the fingertip candidate points. If the number does not meet the requirement, return to the step S304 and repeat the steps S304 and S305 to calculate 5 to 9 extremely far points in addition to the central point.

Figure 7:
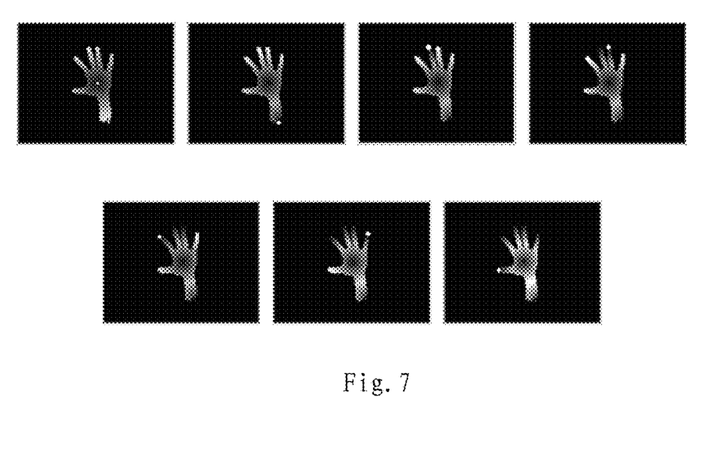
FIG. 7 is a schematic view of the extremely far points of the hand connected region according to an embodiment of the present invention.

FIG. 7 schematically shows the extremely far points of the hand connected region according to an embodiment of the present invention. The first view shows an initial extremely far point, namely a central point. The second to the seventh views show the first to the sixth extremely far points sequentially detected.

Figure 8:
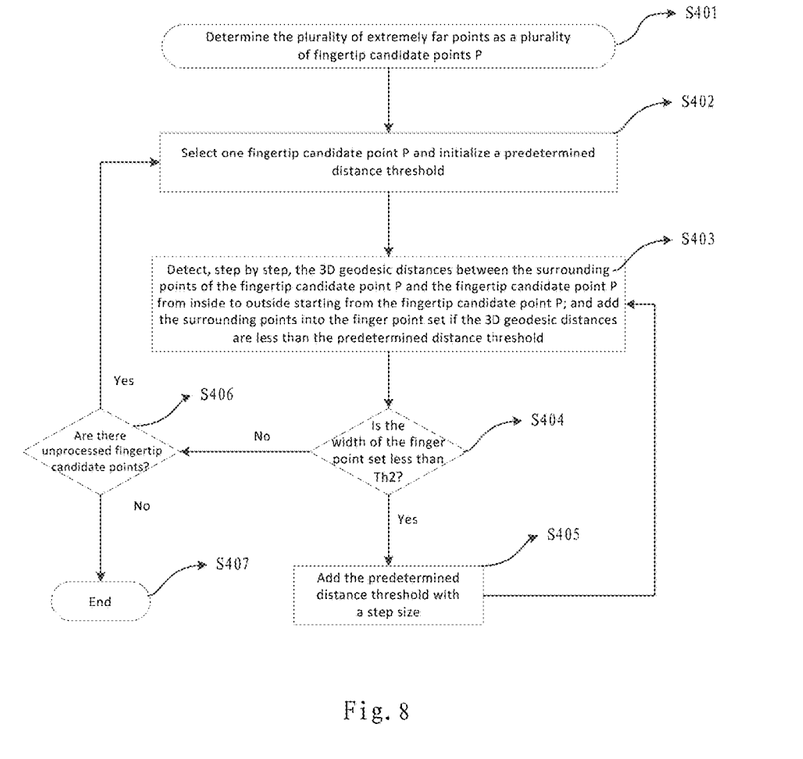
FIG. 8 is a flow chart of a method for detecting fingertips and finger regions according to an embodiment of the present invention.

FIG. 8 is a flow chart of a method for detecting fingertips and finger regions according to an embodiment of the present invention. As shown in FIG. 8, the process of detecting fingertips and finger regions from the plurality of calculated extremely far points include the following steps. First, in the step S401, the plurality of extremely far points are determined as a plurality of fingertip candidate points P.

Then, in the step S402, one fingertip candidate point P is selected and a predetermined distance threshold is initialized, that is, setting the initial value of the predetermined distance threshold. Later, in the step S403, detect, step by step, the 3D geodesic distances between the surrounding points (namely, the surrounding points of the fingertip candidate point P within the hand connected region) of the fingertip candidate point P and the fingertip candidate point P from inside to outside starting from the fingertip candidate point P; and add the surrounding points into the finger point set if the 3D geodesic distances are less than the predetermined distance threshold. Next, in the step S404, it is judged whether the width of the finger point set is less than a second threshold Th2. In an embodiment, the reference value of the second threshold Th2 is 35 mm. If the width of the finger point set is less than the second threshold Th2, move on to the step S405 to add the predetermined distance threshold with a step size and return to the step S403 to continue checking the 3D geodesic distances between the surrounding points of the fingertip candidate point P and the fingertip candidate point P. In an embodiment, the reference value of the step size is 3 mm. If the width of the finger point set is not less than the second threshold Th2 in the step S404, move on to the step S406. In the step S406, it is judged whether there are still unprocessed fingertip candidate points P. If there are still unprocessed fingertip candidate points P, then return to the step S402 to select a next unprocessed fingertip candidate point P and repeat the iteration process. If there are not unprocessed fingertip candidate points P, the iteration process exits in the step S407.

To detect the finger point set or finger regions, the step of detecting, step by step, the 3D geodesic distances between the surrounding points of the fingertip candidate point P and the fingertip candidate point P from inside to outside starting from the fingertip candidate point P in the step S403 needs to recalculate the distance matrix D to the point P. In an embodiment, the step of detecting, step by step, the 3D geodesic distances between the surrounding points of the fingertip candidate point P and the fingertip candidate point P from inside to outside starting from the fingertip candidate point P further comprises the steps as follows. First, a distance matrix D of the same size as the hand connected region $S_H$ is constructed, the distance matrix D having elements corresponding to the pixels of the hand connected region $S_H$ in a one-to-one relationship. Then, as for the elements of the distance matrix D corresponding to the pixels, the depth of which is not 0, the distance of the elements is set to a maximum value, and as for the elements corresponding to the pixels, the depth of which is 0, the distance of the elements is set to a negative number to mean that the distance of these points need not to be calculated. In an embodiment, the maximum value may be 100,000 mm. The negative number may be set to be −1. Let the coordinates of the candidate point P to be $(x_p, y_p)$, then the distance $D(x_p, y_p)$ corresponding to the fingertip candidate point P is set to be 0, and the distance matrix D is updated according to the following steps.

A FIFO queue is established, the coordinates $(x_p, y_p)$ of the fingertip candidate point P are added to the FIFO queue, and the following steps are carried out iteratively for the FIFO queue until no pixel point in the FIFO queue needs to be processed: extracting the current pixel point $(x_0, y_0)$ from the FIFO queue; for each neighbourhood point $(x_1, y_1)$ of the upper, lower, left, right, upper-left, upper-right, lower-left and lower-right neighbourhood points of the current pixel point $(x_0, y_0)$, calculating the three-dimensional distance d between the neighbourhood point $(x_1, y_1)$ and the current pixel point $(x_0, y_0)$; if the distance of the neighbourhood point $(x_1, y_1)$ is greater than the sum of the distance of the current pixel point and the three-dimensional distance d, namely $D(x_1, y_1) > D(x_0, y_0) + d$, setting the distance of the neighbourhood point $(x_1, y_1)$ to be the sum of the distance of the current pixel point and the three-dimensional distance d, namely $D(x_1, y_1) = D(x_0, y_0) + d$, and adding the neighbourhood point $(x_1, y_1)$ into the FIFO queue. In this process, neighbourhood points having a negative distance value need not be processed because they are not the pixel points in the hand connected region, and certainly do not belong to the finger region. In addition, as a faster computing manner, the distance of the neighbourhood point $(x_1, y_1)$ can be first compared with that of the current pixel point $(x_0, y_0)$. If the distance of the neighbourhood point $(x_1, y_1)$ is less than that of the current pixel point $(x_0, y_0)$, there is no need to calculate the three-dimensional distance d and update the neighbourhood point.

After the distance matrix is updated through the iteration process, detect, step by step, the distance of the surrounding points of the fingertip candidate point P in the updated distance matrix from inside to outside starting from the fingertip candidate point P. That is to say, the updated distance matrix enables the finger point set or finger regions to be determined according to the distance threshold.

In an embodiment, in order to judge whether the fingertip candidate point P is a real fingertip, we set a finger length lower limit Th3. If the length of the finger point set is equal to or larger than Th3 when the growth stops, the candidate point is judged as a real "fingertip", and the coordinates $(x_P, y_P)$ of the "fingertip" is recorded; or otherwise, the fingertip candidate point P is judged as a "non-fingertip". To be specific, the step of detecting fingertips from the plurality of calculated extremely far points further comprises the steps of: comparing the length of the finger point set with the third threshold Th3; if the length of the finger point set is greater than or equal to the third threshold Th3, determining the fingertip candidate point P as a real fingertip; and if the length of the finger point set is less than the third threshold Th3, determining the fingertip candidate point P as an unreal fingertip. In an embodiment, the reference value of the third threshold Th3 is 40 mm.

Figure 9:
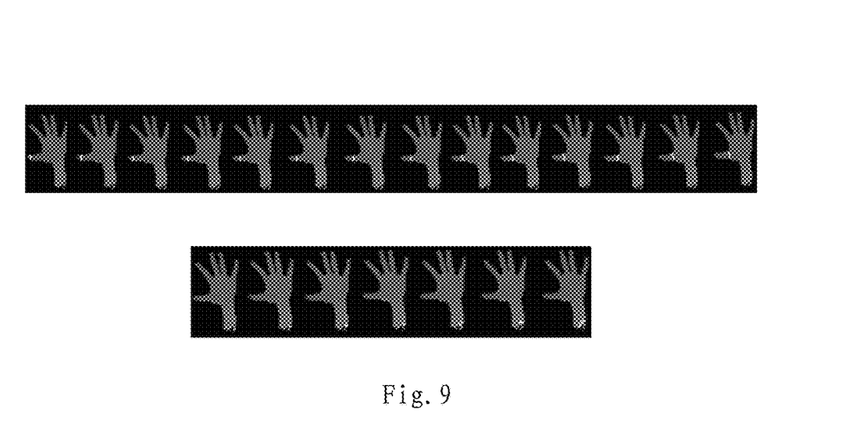
FIG. 9 is a schematic view of the fingertips according to an embodiment of the present invention.

FIG. 9 shows the finger detection process of a real fingertip and that of a false fingertip according to an embodiment of the present invention respectively in an upper view and a lower view. As shown in FIG. 9, the finger detection is started from the point P according to the recalculated distance matrix D. The set of points from which the distance to the point P is less than a predetermined distance threshold is called a finger point set. Gradually the distance threshold is increased. The finger region gradually increases every time the distance threshold is increased by a step size dt. As shown in FIG. 9, every time the distance threshold is increased from left to right, the newly appeared finger pixel point is indicated in white. The size and shape of the finger set is checked. When the width of the finger set exceeds the finger width upper limit Th2, the growing process stops.

Figure 10:
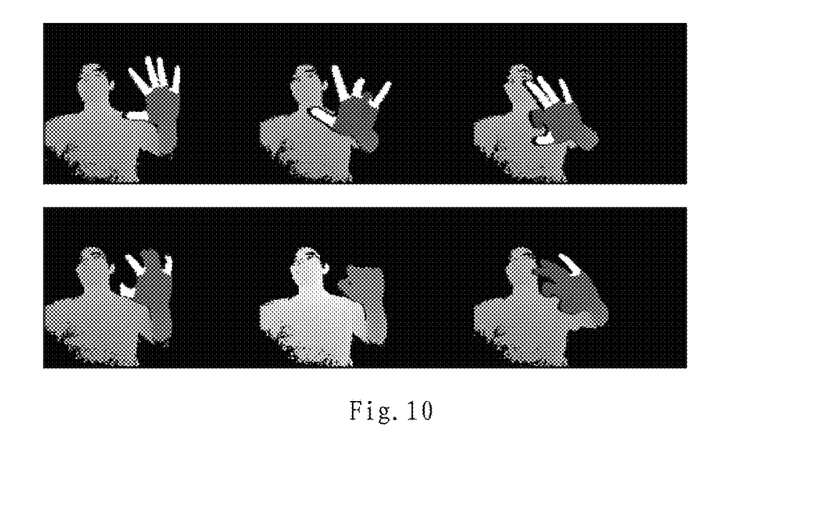
FIG. 10 schematically shows a view of detection results according to an embodiment of the present invention.

After real fingertips and finger regions are determined by the above method, finally the all coordinates of the fingertips and the pixel point set of corresponding fingers detected and recorded by the above method are output. FIG. 10 schematically shows a view of exemplary detection results according to an embodiment of the present invention.

Figure 11:
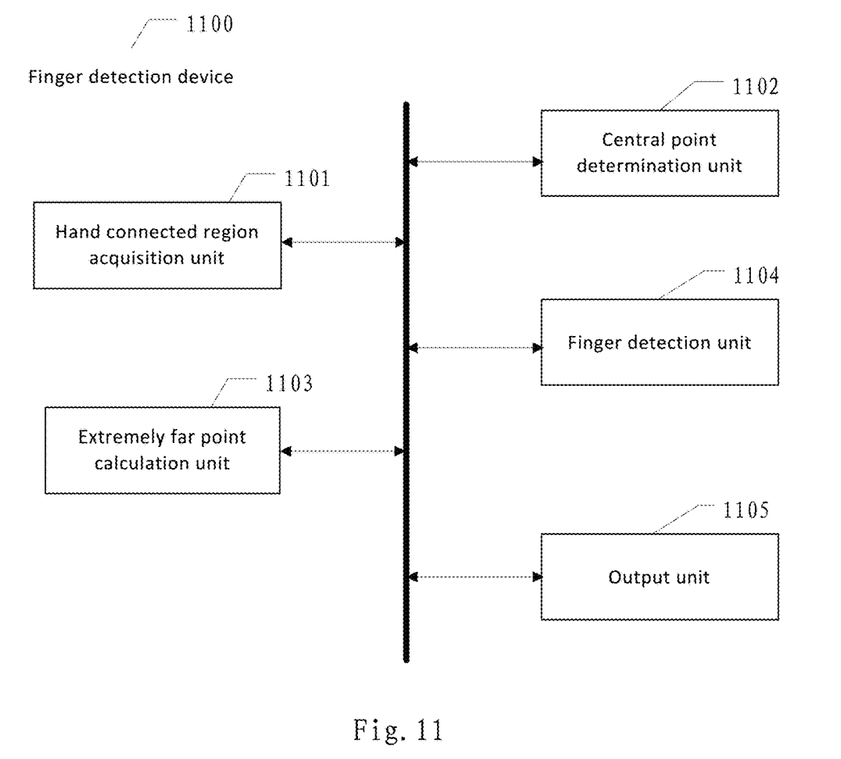
FIG. 11 is a structural schematic view of a finger detection device according to an embodiment of the present invention.

FIG. 11 is a structural schematic view of a finger detection device 1100 according to an embodiment of the present invention. As shown in FIG. 11, the finger detection device 1100 may comprise a hand connected region acquisition unit 1101 that may be configured to receive a user's depth image and acquire a hand connected region from the depth image; a central point determination unit 1102 that may be configured to calculate the central point of the hand connected region; an extremely far point calculation unit 1103 that may be configured to calculate a plurality of extremely far points in the hand connected region that have extremum 3D geodesic distances from the central point; a finger detection unit 1104 that may be configured to detect fingertips and finger regions from the plurality of calculated extremely far points; and an output unit 1105 that may be configured to output fingertip positions and the finger regions.

It shall be pointed out that the finger detection device 1100 can implement any finger detection method as stated above. Since the principle of inventing the finger detection device is the same as that of the finger detection method, the function and operation of the finger detection device 1100 and its components for implementing the above method and steps thereof will not be reiterated herein.

Figure 12:
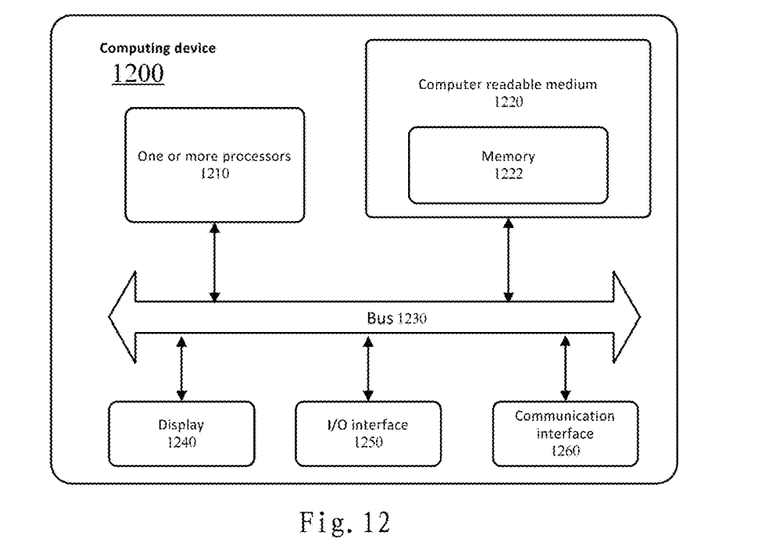
FIG. 12 illustrates an exemplary computing device for implementing one or more embodiments.

FIG. 12 illustrates an exemplary computing device 1200 for implementing one or more embodiments. In particular, the device according to some embodiments can be implemented on the exemplary computing device 1200. As shown, the exemplary computing device 1200 comprises one or more processors 1210 or processing units, one or more computer readable media 1220 including one or more memories 1222, one or more displays 1240 for displaying contents to users, one or more input/output (I/O) interfaces 1250 for an input/output (I/O) device, one or more communication interfaces 1260 for communicating with other computing device or communicating device, and a bus 1230 allowing mutual communications between different components and devices.

Computer readable media 1220, displays 1240 and/or one or more I/O devices can be included as a part of the computing device 1200, or alternatively coupled to the computing device 1200. The bus 1230 refers to one or more bus structures of various types, including a storage bus or storage controller, a peripheral bus, an accelerated graph port, and a processor or local bus of any structure employing various bus architectures. The bus 1230 may comprise a cabled and/or wireless bus.

There is no limitation to one or more processors 1210 in terms of the material or the processing mechanism used. For instance, the processor may consist of one or more semiconductors and/or transistors (such as electronic integrated circuits (IC)). In such a context, the process executable instructions may be electrically executable instructions. The memory 1222 refers to the memory/storage capacity associated with one or more computer readable media. The memory 1222 may comprise volatile media (such as random access memory (RAM)) and/or non-volatile media (such as read-only memory (ROM), flash memory, disks and floppy disks). The memory 1222 may comprise fixed media (such as RAM, ROM, fixed hard-disk drive) and removable media (such as flash memory drive, removable hard-disk drive and disks).

One or more input/output interface 1250 allows users to input orders and information to the computing device 1200, and also allows information to be presented to users and/or other components or devices by means of different input/output devices. Examples of input devices comprise keyboards, touch screen displays, cursor control devices (such as mouse), microphones, scanners and the like. Examples of output devices comprise display devices (such as monitor or projector), speaker, printer, network interface cards and the like.

The communication interface 1260 allows communication with other computing devices or communicating devices. There is no limitation to the communication interface 1260 in terms of the communication technologies. The communication interface 1260 may comprise a wired communication interface such as a LAN communication interface and a WAN communication interface, and a wireless communication interface such as infrared, Wi-Fi or Bluetooth communication interfaces.

The various technologies herein are described in the common environment of software, hardware (fixed logic circuits) or programme modules. Generally speaking, the programme module comprises routines, programmes, objects, elements, components, data structures and the like executing particular tasks or realizing particular abstract data types. Realization of these modules and technologies can be stored in a computer readable medium in some form or transmitted by the computer readable medium. The computer readable medium may comprise various usable media accessible by a computing device.

Particular modules, functions, components and technologies described herein can be implemented in software, hardware, firmware and/or combination thereof. The computing device 1200 may be configured to execute particular instructions and/or functions corresponding to software implemented in a computer readable medium and/or hardware modules. The instructions and/or functions can be executed/operated by a manufactured product (such as one or more computing devices 1200 and/or processors 1210) so as to realize the technologies herein. Such technologies include, but are not limited to, the exemplary processes described herein. Hence, the computer readable medium can be configured to store or provide instructions for realizing the abovementioned different technologies when be accessed by one or more devices described herein.

Although some embodiments of the present invention are specifically described with reference to the above drawings, those skilled in the art can understand that the above detailed depictions are merely for explaining the present invention, and the present invention is, by no means, limited to the above embodiments. On the basis of the specific depictions and teachings of those embodiments herein, those skilled in the art can make various modifications, additions, replacements and variations to the embodiments without departing from the protection scope of the present invention, that is to say, the modifications, additions, replacements and variations fall within the protection scope of the present invention. The protection scope of the present invention shall be based on the protection scope of the appended claims. The specific features and actions described herein are disclosed as examples for realizing the claims.

What needs to be explained is that the above embodiments are only illustrated by way of the individual function modules division. In actual application, the above functions can be allocated to different functional modules as desired. The internal structure of the device can be divided into different functional modules so as to accomplish all or part of the functions as stated above. In addition, function(s) of the above one module can be achieved by a plurality of modules, and functions of the plurality of modules can be integrated into one module.

The present application uses such wordings as "first", "second" and "third". Unless specified in the context, such wordings do not imply any order, but are actually used for the purpose of identification. For instance, the phrases "first threshold" and "second threshold" do not necessarily mean the first threshold is generated, received processed earlier than the second threshold. In fact, these phrases are only used to identify different thresholds.

In the claims, any reference sign in parentheses should not be interpreted as a limitation to the claims. The term "comprise/include" does not exclude the presence of elements or steps other than those listed in the claims. The word "a" or "an" in front of elements do not exclude the presence of a plurality of such elements. In device or system claims that enumerate several means, one or more of the means can be embodied in one and the same item of hardware. The mere fact that some measures are recited in mutually different dependent claims does not indicate that the combination of the measures cannot be used to advantage.

The invention claimed is:

1. A computer implemented finger detection method comprising the steps of:
   acquiring a hand connected region from a user's depth image;
   calculating the central point of the hand connected region;
   calculating a plurality of extremely far points in the hand connected region that have extremum 3D geodesic distances from the central point;
   detecting fingertips and finger regions from the plurality of calculated extremely far points; and
   outputting fingertip positions and the finger regions;
   wherein the step of acquiring a hand connected region from a user's depth image further comprises the steps of:
   detecting all connected regions in the user's depth image by an image growing method; and
   selecting a connected region with the smallest depth among the detected connected regions as a hand connected region.

2. The method according to claim 1, wherein the image growing method further comprises the step of, for each connected region, implementing the following steps:
   establishing a FIFO queue, and selecting one pixel point in the connected region as an initial pixel point to put it in the FIFO queue;
   iteratively implementing the following steps for the FIFO queue until no pixel point in the FIFO queue needs to be processed:
   extracting a current pixel point in the FIFO queue;
   comparing the depth of the current pixel point with the depth of each of four adjacent pixel points that are not in any connected region; and
   if the depth difference between the adjacent pixel point and the current pixel point is less than a first threshold Tth1, adding the adjacent pixel point into the connected region and the FIFO queue; and
   outputting the connected region.

3. The method according to claim 2, wherein the reference value of the first threshold Th1 ranges from 10 mm to 15 mm.

4. The method according to claim 1, wherein the step of calculating the central point of the hand connected region further comprises the steps of:
   calculating the average value of the X coordinates of all the pixel points in the hand connected region as the X coordinate of the central point; and
   calculating the average value of the Y coordinates of all the pixel points in the hand connected region as the Y coordinate of the central point.

5. The method according to claim 4, wherein the step of calculating the central point of the hand connected region further comprises the steps of:

if the calculated central point is not in the hand connected region, appropriately adjusting the position of the central point so as to make the central point in the hand connected region.

6. The method according to claim 5, wherein if the calculated central point is a null point in the depth image, the calculated central point is not in the hand connected region, wherein the null point is a point with the depth of 0 in the user's depth image.

7. The method according to claim 1, wherein the step of calculating a plurality of extremely far points in the hand connected region that have extremum 3D geodesic distances from the central point further comprises:

S301: constructing a distance matrix of the same size as the hand connected region, the distance matrix having elements corresponding to the pixels of the hand connected region in a one-to-one relationship;

S302: as for the elements corresponding to the pixels, the depth of which is not 0, setting the distance of the elements to be a maximum value, and as for the elements corresponding to the pixels, the depth of which is 0, setting the distance of the elements to be a negative number to mean that the distance of these points need not to be calculated;

S303: taking the central point as an initial extremely far point;

S304: setting the corresponding distance of the initial extremely far point in the distance matrix to be 0, and updating the distance matrix according to the minimum value of the 3D geodesic distances between each pixel point with the initial extremely far point as well as all the calculated extremely far points in the hand connected region; and S305: determining the point having the largest distance in the updated distance matrix as the calculated extremely far point, and using the calculated extremely far point as a new initial extremely far point;

repeating the steps S304 and S305 to calculate five to nine extremely far points.

8. The method according to claim 7, wherein the step of updating the distance matrix in the step S304 further comprises the steps of:

establishing a FIFO queue, adding the initial extremely far point to the FIFO queue, and iteratively implementing the following steps for the FIFO queue until no pixel point in the FIFO queue needs to be processed:

extracting the current pixel point from the FIFO queue; for each of the eight neighbourhood points of the current pixel point, calculating the three-dimensional distance d between the neighbourhood point and the current pixel point; if the distance of the neighbourhood point is greater than the sum of the distance of the current pixel point and the three-dimensional distance d, setting the distance of the neighbourhood point to be the sum of the distance of the current pixel point and the three-dimensional distance d, and adding the neighbourhood point into the FIFO queue.

9. The method according to claim 7, wherein the maximum value is 100,000 mm.

10. The method according to claim 1, wherein the step of detecting fingertips and finger regions from the plurality of calculated extremely far points further comprises the steps of:

determining the plurality of extremely far points as a plurality of fingertip candidate points P; and for each fingertip candidate point P, implementing the following iteration process:

detecting, step by step, the 3D geodesic distances between the surrounding points of the fingertip candidate point P and the fingertip candidate point P from inside to outside starting from the fingertip candidate point P; and adding the surrounding points into the finger point set if the 3D geodesic distances are less than the predetermined distance threshold;

if the width of the finger point set is less than a second threshold Th2, adding the predetermined distance threshold with a step size, or otherwise judging whether there are still unprocessed fingertip candidate points P; and if there are still unprocessed fingertip candidate points P, then selecting a next unprocessed fingertip candidate point P and repeating the iteration process; and if there are not unprocessed fingertip candidate points P, exiting the iteration process.

11. The method according to claim 10, wherein the step of detecting, step by step, the 3D geodesic distances between the surrounding points of the fingertip candidate point P and the fingertip candidate point P from inside to outside starting from the fingertip candidate point P further comprises the steps of:

constructing a distance matrix of the same size as the hand connected region, the distance matrix having elements corresponding to the pixels of the hand connected region in a one-to-one relationship;

as for the elements corresponding to the pixels, the depth of which is not 0, setting the distance of the elements to be a maximum value, and as for the elements corresponding to the pixels, the depth of which is 0, setting the distance of the elements to be a negative number to mean that the distance of these points need not to be calculated;

setting the distance corresponding to the fingertip candidate point P to be 0;

establishing a FIFO queue, adding the fingertip candidate point P to the FIFO queue, and iteratively implementing the following steps for the FIFO queue until no pixel point in the FIFO queue needs to be processed:

extracting the current pixel point from the FIFO queue; for each of the eight neighbourhood points of the current pixel point, calculating the three-dimensional distance d between the neighbourhood point and the current pixel point; if the distance of the neighbourhood point is greater than the sum of the distance of the current pixel point and the three-dimensional distance d, setting the distance of the neighbourhood point to be the sum of the distance of the current pixel point and the three-dimensional distance d and adding the neighbourhood point into the FIFO queue; and detecting, step by step, the distance of the surrounding points of the fingertip candidate point P in the updated distance matrix from inside to outside starting from the fingertip candidate point P.

12. The method according to claim 10, wherein the reference value of the second threshold Th2 is 35 mm and/or the reference value of the step size is 3 mm.

13. The method according to claim 10, wherein the step of detecting fingertips from the plurality of calculated extremely far points further comprises the steps of:

comparing the length of the finger point set with a third threshold Th3;

if the length of the finger point set is greater than or equal to the third threshold Th3, determining the fingertip candidate point P as a real fingertip; and if the length of the finger point set is less than the third threshold Th3, determining the fingertip candidate point P as an unreal fingertip.

14. The method according to claim 13, wherein the reference value of the third threshold Th3 is 40 mm.

15. A finger detection device comprising:
a hand connected region acquisition unit configured to receive a user's depth image and acquire a hand connected region from the depth image;
a central point determination unit configured to calculate the central point of the hand connected region;
an extremely far point calculation unit configured to calculate a plurality of extremely far points in the hand connected region that have extremum 3D geodesic distances from the central point;
a finger detection unit configured to detect fingertips and finger regions from the plurality of calculated extremely far points; and
an output unit configured to output fingertip positions and the finger regions;
wherein hand connected region acquisition unit further configured to:
detect all connected regions in the user's depth image by an image growing method; and
select a connected region with the smallest depth among the detected connected regions as a hand connected region.

16. A computer readable non-transitory storage medium, which stores computer readable instructions which, when executed by a computing device, cause the computing device to implement a finger detection method comprising the steps of:
acquiring a hand connected region from a user's depth image;
calculating the central point of the hand connected region;
calculating a plurality of extremely far points in the hand connected region that have extremum 3D geodesic distances from the central point;
detecting fingertips and finger regions from the plurality of calculated extremely far points; and
outputting fingertip positions and the finger regions;
wherein the step of acquiring a hand connected region from a user's depth image further comprises the steps of:
detecting all connected regions in the user's depth image by an image growing method; and
selecting a connected region with the smallest depth among the detected connected regions as a hand connected region.

17. A finger detection device comprising:
a memory configured to store computer readable instructions and data; and
a processor coupled to the memory, which is configured to execute the computer readable instructions to implement a finger detection method comprising the steps of:
acquiring a hand connected region from a user's depth image;
calculating the central point of the hand connected region;
calculating a plurality of extremely far points in the hand connected region that have extremum 3D geodesic distances from the central point;
detecting fingertips and finger regions from the plurality of calculated extremely far points; and
outputting fingertip positions and the finger regions;
wherein the step of acquiring a hand connected region from a user's depth image further comprises the steps of:
detecting all connected regions in the user's depth image by an image growing method; and
selecting a connected region with the smallest depth among the detected connected regions as a hand connected region.

* * * * *